United States Patent
Ling

(10) Patent No.: US 6,414,988 B1
(45) Date of Patent: Jul. 2, 2002

(54) AMPLITUDE AND PHASE ESTIMATION METHOD IN A WIRELESS COMMUNICATION SYSTEM

(75) Inventor: Fuyun Ling, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/310,232

(22) Filed: May 12, 1999

(51) Int. Cl.⁷ ............................................. H04B 1/707
(52) U.S. Cl. ...................... 375/150; 375/147; 370/209
(58) Field of Search ................ 375/130, 140, 375/142, 147, 150; 370/209, 210, 335, 342

(56) References Cited

U.S. PATENT DOCUMENTS

| | | | |
|---|---|---|---|
| 5,555,268 A | 9/1996 | Fattouche et al. ........... | 375/206 |
| 5,784,360 A | 7/1998 | I et al. ....................... | 370/252 |
| 5,881,056 A * | 3/1999 | Huang et al. ............... | 370/335 |
| 5,912,931 A * | 6/1999 | Matsumoto et al. ......... | 375/340 |
| 5,960,029 A * | 9/1999 | Kim et al. .................. | 375/140 |
| 5,978,413 A * | 11/1999 | Bender ....................... | 375/149 |
| 6,058,138 A * | 5/2000 | Fukumasa et al. ......... | 375/130 |
| 6,067,292 A * | 5/2000 | Huang et al. ............... | 370/342 |
| 6,070,086 A * | 5/2000 | Dobrica ...................... | 455/522 |
| 6,134,260 A * | 10/2000 | Bottomley et al. ......... | 375/130 |
| 6,137,840 A * | 10/2000 | Tiedemann, Jr. et al. ... | 375/297 |
| 6,178,194 B1 * | 1/2001 | Vasic ......................... | 375/136 |

FOREIGN PATENT DOCUMENTS

| | | |
|---|---|---|
| EP | 0856955 | 8/1998 |
| EP | 0887947 | 12/1998 |
| WO | 9708846 | * 3/1997 |
| WO | 9826544 | 6/1998 |
| WO | 9858461 | 12/1998 |

OTHER PUBLICATIONS

Fukasawa, et al. "Configuration and Characteristics of an Interference Cancellation System Using a Pilot Signal for Radio Channel Estimation" Electronics and Communications in Japan 79(1): 100–115 (1996).

* cited by examiner

Primary Examiner—Young T. Tse
(74) Attorney, Agent, or Firm—Philip Wadsworth; Kent D. Baker; Byron Yafuso

(57) ABSTRACT

Apparatus for a transmitter and a receiver which enhance the performance of a system coherent demodulation by utilizing non-pilot sub-channels to enhance the accuracy of estimates of amplitude and phase noise inherent in the transmission channel is described. This enhancement is accomplished by utilizing the corrected received data on a fundamental channel to enhance a pilot channel estimate, which is subsequently utilized by a dot product module in demodulating a supplementary data channel.

59 Claims, 4 Drawing Sheets

AMPLITUDE AND PHASE ESTIMATION METHOD IN A WIRELESS COMMUNICATION SYSTEM

BACKGROUND OF THE INVENTION

I. Field of the Invention

The current invention relates to wireless telecommunications. More particularly, the present invention relates to a novel and improved method of compensating for phase and amplitude distortion of multiple signals transmitted through a single channel.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. Techniques for distinguishing different concurrently-transmitted signals in multiple access communication systems are also known as channelization. The spread spectrum modulation technique of CDMA has significant advantages over other multiple access techniques.

The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", and in U.S. Pat. No. 5,751,761, entitled "SYSTEM AND METHOD FOR ORTHOGONAL SPREAD SPECTRUM SEQUENCE GENERATION IN VARIABLE DATA RATE SYSTEMS", both assigned to the assignee of the present invention and incorporated by reference herein. Code division multiple access communications systems have been standardized in the United States in Telecommunications Industry Association TIA/EIA/IS-95-A, entitled "MOBILE STATION-BASE STATION COMPATIBILITY STANDARD FOR DUAL-MODE WIDEBAND SPREAD SPECTRUM CELLULAR SYSTEM", hereafter referred to as IS-95 and incorporated by reference herein.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission", hereafter referred to as cdma2000 and incorporated by reference herein. A second of these proposals was issued by the European Telecommunications Standards Institute (ETSI), entitled "The ETSI UMTS Terrestrial Radio Access (UTRA) ITU-R RTT Candidate Submission". And a third proposal was submitted by U.S. TG 8/1 entitled "The UWC-136 Candidate Submission" (referred to herein as EDGE). The contents of these submissions is public record and is well known in the art.

In the CDMA demodulator structure used in some IS-95 systems, the pseudonoise (PN) chip interval defines the minimum separation two paths must have in order to be combined. Before the distinct paths can be demodulated, the relative arrival times (or offsets) of the paths in the received signal must first be determined. The demodulator performs this function by "searching" through a sequence of offsets and measuring the energy received at each offset. If the energy associated with a potential offset exceeds a certain threshold, a demodulation element, or "finger" may be assigned to that offset. The signal present at that path offset can then be summed with the contributions of other fingers at their respective offsets. The use of CDMA searchers is disclosed in U.S. Pat. No. 5,764,687, entitled "MOBILE DEMODULATOR ARCHITECTURE FOR A SPREAD SPECTRUM MULTIPLE ACCESS COMMUNICATION SYSTEM", assigned to the assignee of the present invention and incorporated by reference herein.

In the CDMA receiver structure used in some IS-95 systems, data passing from transmitter to receiver is divided into frames which are transmitted at fixed time intervals. Depending on the varying amount of data to be transmitted during each interval, the transmitter places the data into one of several sizes of frame. Since each of these frame sizes corresponds to a different data rate, the frames are often referred to variable-rate frames. The receiver in such a system must determine the rate of each received frame to properly interpret the data carried within the received frame. Such rate determination methods often include the generation of frame quality metrics, which may be used to assess the level of uncertainty associated with the determined frame rate. Methods of performing rate determination and generating frame quality metrics are disclosed in U.S. Pat. No. 5,751,725, entitled "METHOD AND APPARATUS FOR DETERMINING THE RATE OF RECEIVED DATA IN A VARIABLE RATE COMMUNICATION SYSTEM", assigned to the assignee of the present invention and incorporated by reference herein.

Signals in a CDMA system may be complex PN spread as described in U.S. patent application Ser. No. 08/856,428, entitled "REDUCED PEAK TO AVERAGE TRANSMIT POWER HIGH DATA RATE IN A CDMA WIRELESS COMMUNICATION SYSTEM," filed Apr. 9, 1996, assigned to the assignee of the present invention and incorporated by reference herein, and in accordance with the following equations:

$$I = I'PN_I + Q'PN_Q \tag{1}$$

$$Q = I'PN_Q - Q'PN_I \tag{2}$$

where $PN_I$ and $PN_Q$ are distinct PN spreading codes and I' and Q' are two channels being spread at the transmitter.

As described in cdma2000, transmission signals are constructed utilizing orthogonal Walsh coding, with one Walsh code used to transmit a pilot sub-channel signal. The orthogonal Walsh sub-channels used to construct such transmission signals are added together before being transmitted, and travel through the same transmission channels or pathways before being received at the receiver. Each transmission channel, by its inherent nature, alters the phase and amplitude of the signals passing through it, and also adds a component of thermal noise. These channel characteristics change with any movement by transmitter or receiver, but may vary over time even when both receiver and transmitter are stationary. Channel characteristics generally change very slowly compared with the data symbols transmitted through the channel.

Some CDMA receivers employ circuits which estimate the phase and amplitude distortion of the channel. These estimates are then used to compensate for channel distortion, enabling more accurate decoding and demodulation of the received signals. One such circuit for estimating phase and amplitude of a channel, and performing a dot product of that output with the demodulated data signal, is described in detail in U.S. Pat. No. 5,506,865, entitled "PILOT CARRIER DOT PRODUCT CIRCUIT", assigned to the assignee of the present invention and incorporated by reference herein. In that described implementation, an all-zero pilot channel is received and used to estimate the channel characteristics. The resultant channel estimates are then used to convert demodulated signals to scalar digital values.

All CDMA signals transmitted on orthogonal sub-channels cause mutual interference to each other, as well as acting as jammers for adjacent cell areas. To enable coherent demodulation of orthogonal sub-channel signals, one sub-channel is often dedicated as a pilot carrier. As detailed in aforementioned U.S. Pat. No. 5,506,865, the pilot carrier is used in the receiver to produce estimates of the channel characteristics. The accuracy of these channel estimates is dependent on the strength of the pilot channel signal. Unfortunately, the pilot channel carries no data, so it is desirable to minimize the pilot transmit power. Conventionally the pilot power relative to the data signal power is selected by balancing between these two factors such that the best overall system performance can be achieved. For this reason, a method of producing accurate channel estimates which does not require increased pilot signal strength is highly desirable.

SUMMARY OF THE INVENTION

The present invention describes a method and apparatus for improving the performance of a receiver that receives multiple sub-channel signals transmitted together through a common propagation path, also called a transmission channel. In order to compensate for phase and amplitude distortion introduced into the signals by the transmission channel, the receiver uses a pilot sub-channel signal to estimate the phase and amplitude distortion of the transmission channel. The process of estimating of distortion inherent in the transmission channel is called channel estimation, which is used to produce channel estimates. The invention includes a novel method of utilizing data-carrying sub-channels (not the pilot sub-channel) to improve the accuracy of channel estimates. The present invention is applicable to any communication system employing simultaneous transmission of multiple sub-channels and coherent demodulation.

The sub-channel signals within an information signal may be either time division multiplexed (TDMed) or code division multiplexed (CDMed). The exemplary embodiment describes the present invention in the context of the reverse link proposed in cdma2000. Because of overriding commonalties in channel structure, the present invention is equally applicable to reception of the reverse link transmissions according to the candidate submission proposed by the European Telecommunications Standards Institute (ETSI), entitled "The ETSI UMTS Terrestrial Radio Access (UTRA) ITU-R RTT Candidate Submission" (hereafter WCDMA). Moreover, the present invention is equally applicable to reception of the forward link of these systems.

In cdma2000, the data-bearing sub-channels include a high data rate (e.g. 76.8 kbps) supplemental channel and a low data rate (e.g. 9.6 kbps) fundamental channel. The nominal power of the pilot channel is optimized for demodulation of the fundamental channel (e.g., ¼ of the fundamental channel power). In order to enable proper demodulation of the high data rate supplemental channel, the cdma2000 standard proposes to increase the pilot power beyond nominal levels when the supplemental channel is in use. In addition, the cdma2000 standard proposed to use different levels of pilot power depending on which of several available data rates the supplemental channel is using.

Varying the pilot power according to data rate causes other difficulties in system design. For example, it requires the receiver to know the data rate in advance in order for the power control loop to behave correctly. This also makes the selection of searching/finger locking more difficult. Moreover, it is desirable to reduce the pilot overhead to improve overall system performance if it can be done without sacrificing demodulation performance.

By enabling the formation of channel estimates based on the fundamental channel signal, the present invention enables a system to achieve superior supplementary channel demodulation performance. If enough channel estimate information can be extracted from the fundamental channel, acceptable supplementary channel demodulation performance may be achieved without varying the pilot power at all. Because the fundamental signal can be transmitted with as much as 4 times the power of the pilot signal, a channel estimate formed using both signals is much more accurate than an estimate based on the pilot signal alone. Subsequent demodulation using the more accurate channel estimate will have improved performance as well.

In cdma2000, the transmit power of the fundamental channel is four times that of the nominal pilot. The combined power of the pilot and fundamental channels would be five times the power of just the nominal pilot channel. A combined channel estimate derived from both the nominal pilot and fundamental channels would be accurate enough for demodulating a cdma2000 supplemental channel. Though increasing the pilot power whenever the supplemental channel is in use would still be an option, it may not be necessary given the enhanced accuracy of the combined channel estimate.

The added accuracy of a channel estimate extracted from the received fundamental channel depends on the use of a correct reference signal, which is optimally identical to the transmitted fundamental channel signal. Any inaccuracy in the decoded symbols used in forming fundamental channel estimates will degrade the quality of the combined channel estimate. Though the supplemental channel is likely to be a packet data channel, which has a high tolerance for frame errors, it may still be desirable to minimize the frame error rate when demodulating the supplemental channel.

In the preferred embodiment of the invention, the received fundamental channel signal is first deinterleaved and forward error correction (FEC) decoded to take advantage of the transmitter's complementary FEC encoding and interleaving functions. Then, the corrected symbol stream is re-encoded and re-interleaved to produce an ideal replica of the transmitted signal for use as a reference signal by the channel estimator.

In an alternative embodiment of the invention, fundamental channel power is increased as necessary to reduce the fundamental channel error rate. Because decreasing the fundamental channel error rate produces a more accurate channel estimate, increasing fundamental channel power also results in a reduced error rate when demodulating the supplemental channel. When the data rate ratio between the supplemental and the fundamental channels is large, a slight increase in fundamental channel power has little effect on the total transmitted power and hence causes little degradation.

In a more general sense, the present invention can be used where a single channel of information is transmitted. In an alternate embodiment using a single data channel, the channel is artificially split into two physical channels, which are transmitted synchronously at different data rates. Upon receipt, the low rate channel is first demodulated and decoded using pilot based channel estimates. The decoded bits are then re-encoded and used to improve the channel estimates used to coherently demodulate the high data rate supplemental channel. This scheme may enable data throughput which draws nearer to the theoretical capacity limit in a fading environment.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
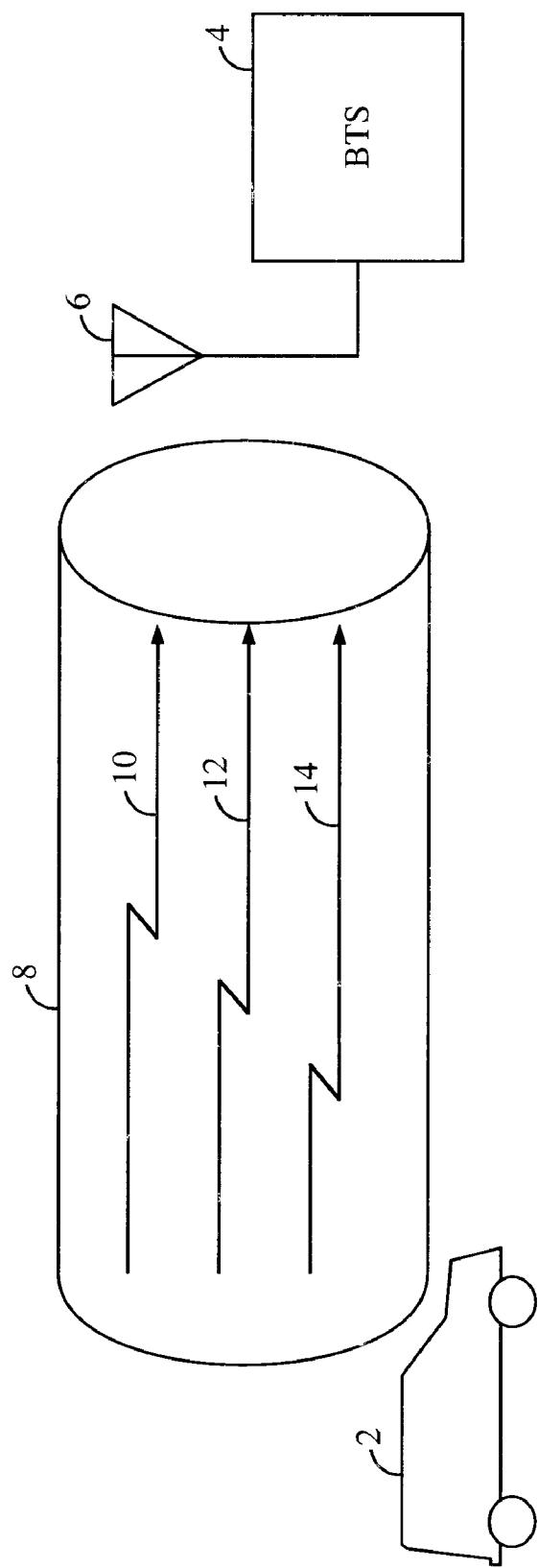
FIG. 1 is a diagram illustrating basic components of a wireless communication system incorporating an embodiment of the invention.

FIG. 1 shows the present invention in the context of a wireless communication system. In the exemplary embodiment, subscriber station 2 transmits several code division multiplexed signals through a transmission channel 8 to a base station transceiver subsystem (BTS) 4 through receive antenna 6. In the exemplary embodiment of a cdma2000 or WCDMA reverse link, the code division multiplexed channels are distinguished from one another using orthogonal coding. This method of providing orthogonal coding is described in detail in aforementioned copending U.S. patent application Ser. No. 08/856,428.

In the exemplary embodiment, the three types of CDMA signals transmitted from subscriber station 2 to base station transceiver subsystem 4 are pilot 10, fundamental 12, and supplemental 14. In the exemplary embodiment, the signals transmitted from subscriber station 2 are code division multiple access communication signals including a pilot channel, a fundamental channel, and a supplemental channel, as defined in cdma2000. The generation and transmission of code division multiple access communication signals is well known in the art and is described in detail in the aforementioned U.S. Pat. No. 5,103,459 and in the IS-95 specification.

The subscriber station 2 is shown as a mobile station, but could also be a wireless modem, wireless local loop subscriber station, a BTS, or any other wireless communication equipment which transmits multiple synchronous sub-channels. The receiver station 4 is shown as a BTS, but could also be a wireless subscriber station or any other receiver which coherently demodulates multiple sub-channels. The method and apparatus for simultaneously receiving multiple transmissions is well known in the art. In the exemplary embodiment, the signals transmitted from subscriber station 2 are received at BTS 4 using a RAKE receiver, the implementation of which is well known In the art and is described in the aforementioned U.S. Pat. No. 5,109,390.

Figure 2:
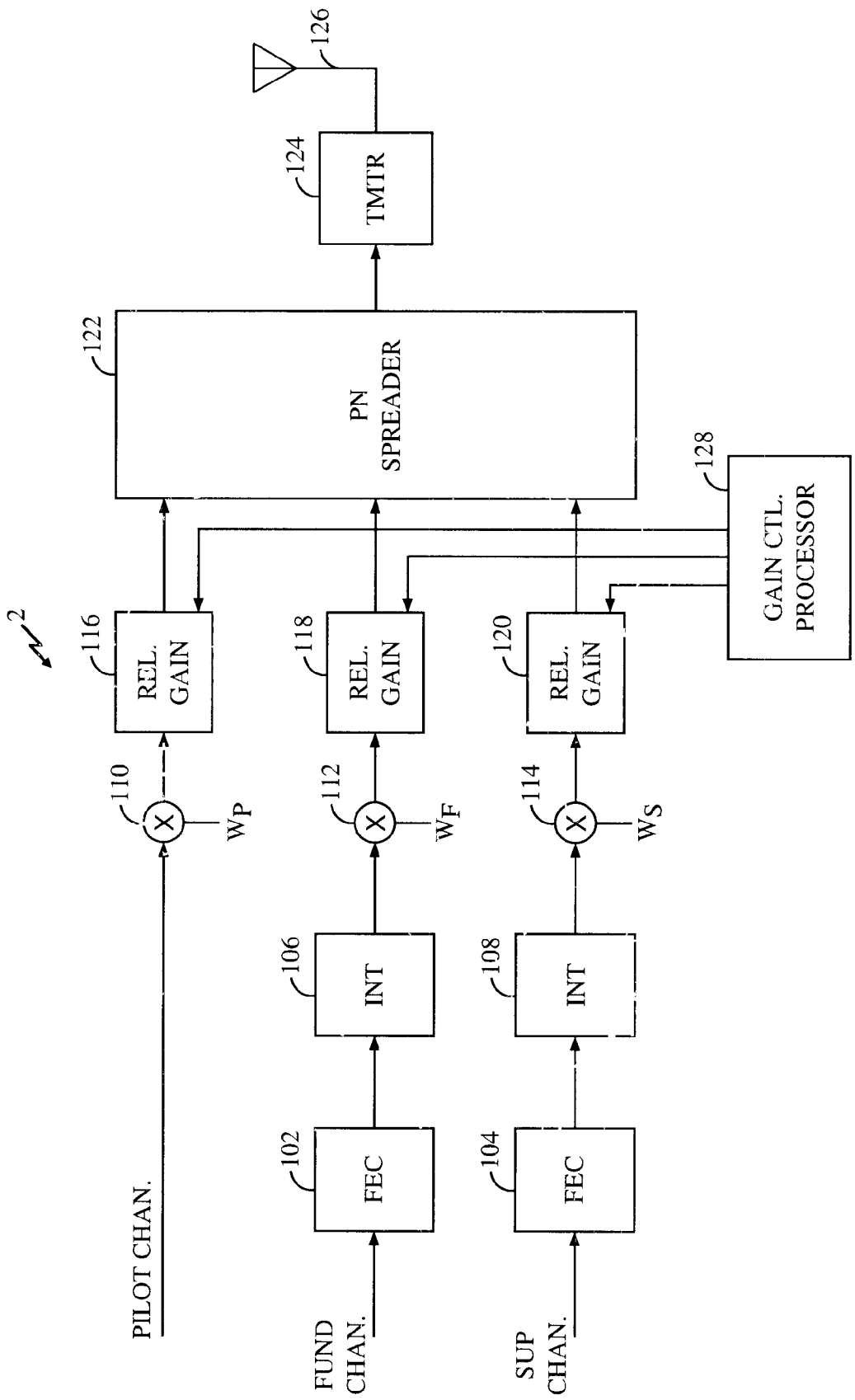
FIG. 2 is a block diagram of a preferred embodiment of the invention in a wireless transmitter.

FIG. 2 shows subscriber station 2 capable of transmitting multiple synchronous sub-channels in accordance with one embodiment of the invention. In FIG. 2, pilot, supplemental, and fundamental channel signals are produced for transmission on orthogonal sub-channels.

The pilot channel is a known, constant transmitted waveform, and therefore carries no data. For this reason, forward error correction and interleaving are unnecessary on the pilot channel. The pilot channel is sent directly into a Walsh spreader 110 which spreads the data according to a pilot channel Walsh function $W_P$, thus producing a Walsh covered pilot channel signal. The Walsh covered pilot channel signal is then sent to a relative gain module 116, which adjusts the amplitude of the covered pilot channel signal relative to the signals carried by other orthogonal transmit sub-channels. In the preferred embodiment, the pilot channel Walsh function is the all-zero Walsh code, the pilot channel Walsh spreader 110 is omitted, and a DC signal is sent directly into relative gain module 116.

The fundamental channel data is first sent to a forward error correction (FEC) encoder 102, which produces an encoded fundamental channel signal. The resultant encoded fundamental channel signal is sent to an interleaver 106, which produces an interleaved fundamental channel signal. The interleaved fundamental channel signal is then sent to the Walsh spreader 112, which spreads the data according to a fundamental channel Walsh function $W_F$, thus producing a covered fundamental channel signal. The covered fundamental channel signal is then sent to a relative gain module 118, which adjusts the amplitude of the covered fundamental channel signal relative to the signals carried by other orthogonal transmit sub-channels.

The supplemental channel data is first sent to a forward error correction (FEC) encoder 104, which produces an encoded supplemental channel signal. The resultant encoded supplemental channel signal is sent to an interleaver 108, which produces an interleaved supplemental channel signal. The interleaved supplemental channel signal is then sent to the Walsh spreader 114, which spreads the data according to a supplemental channel Walsh function $W_S$, thus producing a covered supplemental channel signal. The covered supplemental channel signal is then sent to a relative gain module 120, which adjusts the amplitude of the covered supplemental channel signal relative to the signals carried by other orthogonal transmit sub-channels.

Though the preferred embodiment shown uses orthogonal Walsh functions to accomplish sub-channel coding, one skilled in the art will appreciate that the sub-channel coding could also be accomplished using TDMA or PN coding without departing from the current invention. In an embodiment utilizing PN coding, the reference signals $W_S$, $W_P$, and $W_F$ are replaced by PN codes corresponding to the supplemental, pilot, and fundamental channels respectively.

One skilled in the art will appreciate that the FEC modules 102 and 104 could employ any of a number of forward error correction techniques without departing from the current invention. Such techniques include turbo-code encoding, convolutional coding, or other form of coding such as block coding. In addition, the interleavers 106 and 108 could utilize any of a number of interleaving techniques, including convolutional interleaving, turbo-interleaving, block interleaving and bit reversal interleaving. Turbo code encoders and turbo interleavers are described in aforementioned cdma2000 specification.

The output of each relative gain module 116, 118, and 120 is then sent to the PN spreader module 122. The output of the PN spreader module 122 is then sent to transmitter 124. Transmitter 124 provides additional control of transmit gain by varying the gain of the entire composite signal received from PN spreader module 122 before transmitting the signal through antenna 126.

In an alternative embodiment, the optional relative gain module 116 is omitted, and the pilot signal is sent directly to the PN spreader module 122. The gains of other channels are adjusted with respect to the gain of the pilot channel. One skilled in the art will appreciate that the two methods of controlling relative gains of the channels, using the system including relative gain module 116 or without relative gain module 116, are functionally equivalent.

One skilled in the art will appreciate that any sub-channel signal may be "turned off" by causing its effective transmit gain to equal zero. This may be accomplished by so configuring its respective relative gain module 116, 118, or 120. The same result may be obtained by discontinuing the progress of the subchannel signal through the PN spreader, such as with a logic switch. One skilled in the art will appreciate that one may use either method of setting a sub-channel's effective transmit gain to zero without departing from the present invention.

PN spreader 122 spreads the orthogonal channel signals using a pseudorandom generated spreading sequence and sends the resultant composite signal to the transmitter 124 for transmission through the antenna 126. In the preferred embodiment, the PN spreader 122 utilizes complex PN spreading, as described in aforementioned U.S. patent application Ser. No. 08/856,428. As shown in FIG. 33 of aforementioned cdma2000 specification, the PN spreader 122 may additionally rotate the signals of the fundamental and supplemental channel outputs of gain modules 118 and 120 by 90 degrees relative to the pilot channel signal output by gain module 116 prior to performing PN spreading.

One skilled in the art will appreciate that PN spreader 122 could produce one complex spread signal for each input signal, allowing relative gain modules 116, 118, and 120, to be placed after PN spreader 122 and before transmitter 124.

In an alternative embodiment, the relative gains applied by relative gain modules 116, 118, and 120 are controlled dynamically by gain control processor 128. The gain of each module may be altered according to data rates of the channels. For example, the pilot channel gain may be increased when data is being transmitted on both the fundamental and the supplemental channel. Or, the fundamental channel gain may be increased when data is being transmitted on the supplemental channel.

Figure 3:
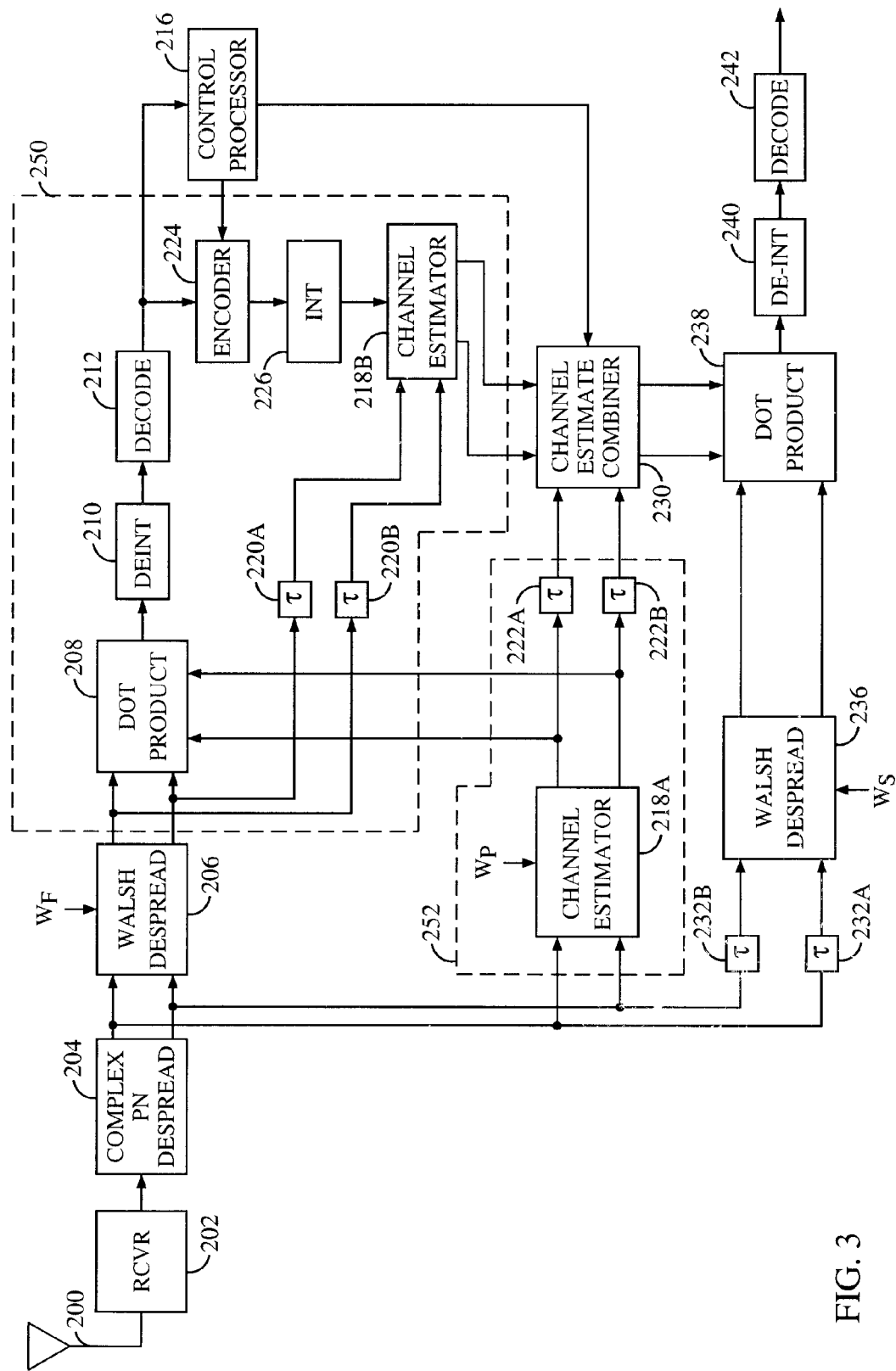
FIG. 3 is a block diagram of a preferred embodiment of the invention in a wireless receiver.

FIG. 3 shows a preferred embodiment of the invention as used in a wireless receiver. The composite signal containing three orthogonal subchannels is received through the antenna 200 and is downconverted in the receiver 202. The resultant downconverted signal is then sent to the complex PN despreader 204 to produce I and Q component samples used in subsequent processing. Complex PN despreader operates in accordance with aforementioned in U.S. patent application Ser. No. 08/856,428. The operation of fundamental channel estimation apparatus 250, pilot channel estimation apparatus 252, and channel estimate combiner 230 are explained in detail below.

The I and Q component samples are sent to a Walsh despreader 206, which uses the same Walsh function $W_F$ used to spread the fundamental channels in the Walsh spreader 112. The Walsh despreader 206 produces I and Q components for the decovered fundamental channel.

The I and Q component signals are also input into pilot channel estimator 218a, to produce filtered Pilot I and Pilot Q samples. Pilot channel estimator 218a is shown with an input of Walsh code $W_P$, which corresponds to the $W_P$ used to spread the pilot channel in Walsh spreader 110.

Figure 4:
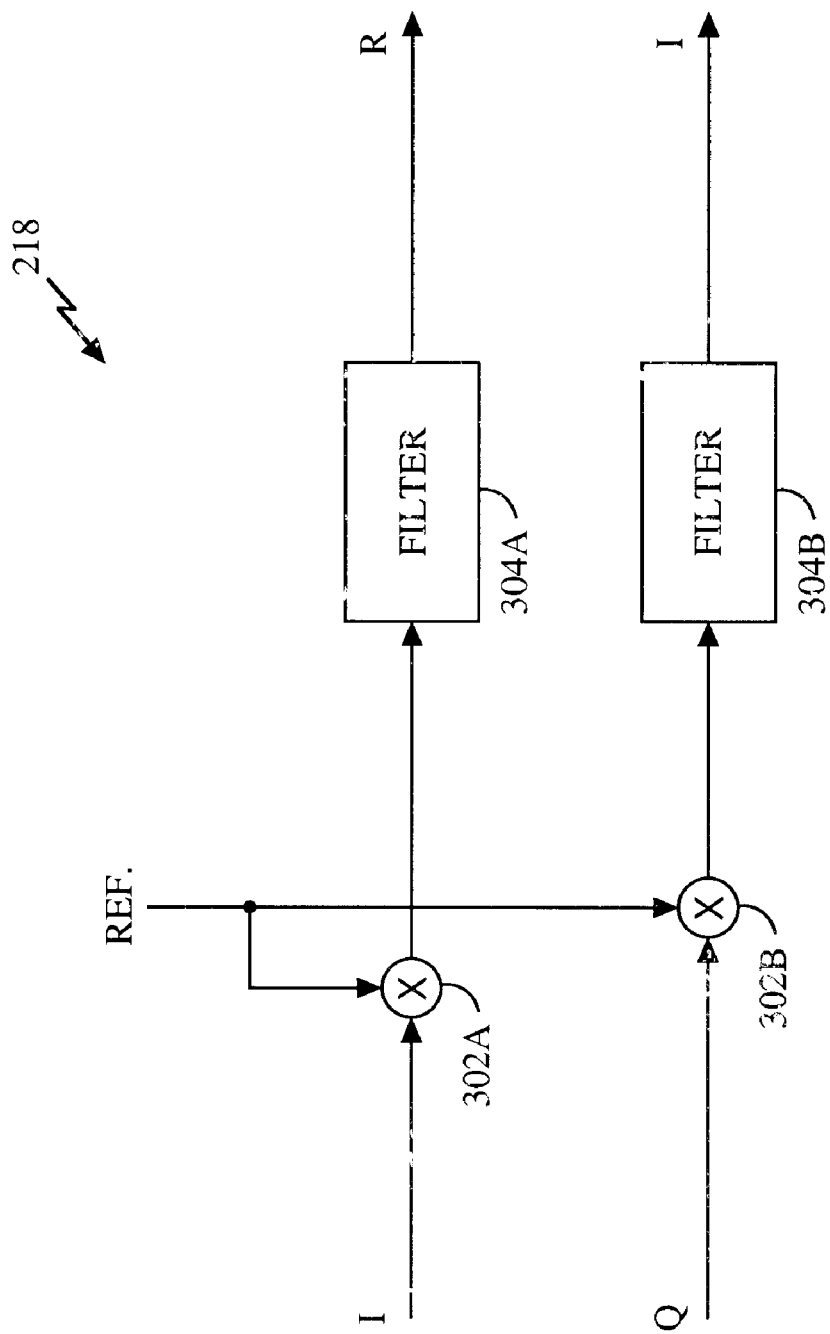
FIG. 4 is a block diagram of an exemplary channel estimator circuit.

FIG. 4 shows an exemplary embodiment of a channel estimator 218. The complex input signal is provided to channel estimator 218 as I and Q sample streams. The I samples are mixed with a reference signal in mixer 302a, to extract a real component of the complex input signal. The output of mixer 302a is provided to noise rejection filter 304a to remove noise from the extracted real component. In mixer 302b, The Q samples are mixed with the same reference signal as used in mixer 302a in order to extract an imaginary component of the complex input signal. The output of mixer 302b is provided to noise rejection filter 304b to remove noise from the extracted imaginary component. One skilled in the art will appreciate that the noise rejection filters 304 may be implemented as low-pass filters, matched filters, or accumulators without departing from the current invention.

The reference signal used in a channel estimator 218 could be real, imaginary, or complex. In an alternative embodiment of a channel estimator 218 appropriate for use with a complex reference signal, mixers 302 are complex multipliers (which may also be called complex mixers), each having both real and imaginary outputs. The real outputs of mixers 302 are then summed before being filtered in real-component filter 304a. The imaginary outputs of mixers 302 are summed before being filtered in imaginary-component filter 304b. In the same fashion, complex multipliers could be used in a Walsh spreader or despreader to allow the use of complex Walsh codes as reference functions during spreading and despreading. Walsh spreading using complex Walsh codes is known as complex Walsh spreading, and Walsh despreading using complex Walsh codes is known as complex Walsh despreading.

In the proposed cdma2000 standard, the pilot channel is transmitted 90 degrees out of phase with the fundamental and supplemental channels. In the preferred embodiment, therefore, the pilot channel estimator 218a rotates its output by 90 degrees. This rotation may be accomplished in many ways, including multiplying the reference by an imaginary value, or by rotating the real and imaginary outputs of noise rejection filters 304. The same end result may also be accomplished by rotating the signals of the fundamental and supplementary channels without departing from the current invention. Also, the relative rotation of the pilot channel in relation to the fundamental and supplementary channels may be positive or negative without departing from the current invention.

Together, the extracted real and imaginary components constitute a channel estimate vector containing amplitude and phase information for any signal component which correlates with the reference signal. The quality of the channel estimate depends on the degree of correlation between the received complex input signal and the reference signal. To achieve the highest degree of correlation between the received complex input signal and the reference signal, the reference signal used by the receiver must exactly match that transmitted by the transmitter, for example Walsh code $W_P$ in the case of the pilot channel. Any difference between the reference signal and the transmitted signal can cause inaccuracy in the channel estimate.

In an IS-95 system, the pilot Walsh code WP is an all-zero Walsh code, in which case a channel estimate can be made using just a pair of filters, as is described in aforementioned U.S. Pat. No. 5,506,865. In this case, pilot channel Walsh spreader 110 is omitted from the transmitter. The channel estimator in the receiver could then be implemented such that the mixers 302 could be omitted from pilot channel estimator 218a. A channel estimator for an all-zero Walsh code pilot, consisting of filters without mixers, is also known as a pilot filter. The embodiment of the channel estimator depicted in FIG. 4, however, allows the use of a pilot Walsh code other than the all-zero Walsh code.

Together, the Pilot I and Pilot Q signals are used as an estimate of the amplitude and phase characteristics of the CODMA transmission channel 8. The resultant Pilot I and Pilot Q, along with the decovered fundamental channel I and Q components are provided to dot product module 208. Dot product module 208 computes the scalar projection of the fundamental channel signal onto the pilot channel estimate vector, in accordance with the circuit described in aforementioned U.S. Pat. No. 5,506,865. Because the pilot channel signal 10, the fundamental channel signal 12, and the supplemental channel signal 14 have traversed the same propagation path 8, the channel Induced phase error is the same for all three signals.

This phase error is removed by performing the dot product operation described in aforementioned U.S. Pat. No. 5,506,865. In the exemplary embodiment, the fundamental channel is coherently demodulated in a dot product module 208 using a pilot channel estimate. The dot product module produces a scalar signal for each symbol period, which is indicative of the magnitude of the fundamental channel signal that is in phase with the pilot signal received through the transmission channel 8.

The fundamental channel symbols output by the dot product module 208 is then sent into deinterleaver 210, which performs the inverse of the function of transmit interleaver 106. The resultant deinterleaved signal is then sent to forward error correction (FEC) decoder 212. Decoder 212 performs the inverse function of the FEC encoder 102 and outputs a forward error corrected signal.

The corrected signal output by decoder 212 is also sent to an encoder 224, which re-encodes the signal using the same FEC function as the transmitter FEC encoder 102. In this way, encoder 224 produces an ideal representation of the transmitted fundamental signal. This ideal representation is then sent to an interleaver 226, which performs the same function as the transmitter interleaver 106, producing an ideal representation of the interleaved fundamental channel data transmitted by subscriber station 2.

The I and Q component samples produced by Walsh despreader are also input into delays 220, which produce I and Q components which are synchronized with the output of the interleaver 226. Delays 220 are designed to compensate for the delays introduced by the dot product module 208, the deinterleaver 210, the decoder 212, the encoder 224, and the interleaver 226.

The synchronized I and Q components output by delays 220 are then sent, along with the output of interleaver 226, into channel estimator 218b. Channel estimator 218b uses the output of interleaver 226 as a reference signal, and uses the outputs of delays 220 as the I and Q sample stream from which it forms a channel estimate output.

The corrected bits output by FEC decoder 212 are re-encoded and reinterleaved to produce a reference signal which has a higher probability of matching what was actually transmitted on the fundamental channel. By using this more reliable reference signal as input for channel estimator 218b, the accuracy of fundamental channel estimates produced by channel estimator 218b is improved.

In a suboptimal embodiment, instead of using deinterleaver 210, decoder 212, encoder 224, and interleaver 226 to create an ideal representation of the fundamental channel signal, the output of dot product module 208 could be provided directly to channel estimator 218b. In this case, delay elements 220 would only compensate for the time required to perform the dot product operation in dot product module 208. However, the fundamental channel estimator would not gain the error correction benefits of the bypassed components.

The complex output components of the pilot channel estimator 218a are subjected to delay elements 222 to compensate for the delay inherent in performing channel estimation using the fundamental channel signal. The channel estimation parameters produced by processing of the fundamental channel is sent, along with the delayed channel estimation parameters from the delay elements 220 and 222 into channel estimate combiner 230. Channel estimate combiner 230 combines the channel estimation data for both pilot and fundamental channel processing and produces output containing a third, combined channel estimate. As the characteristics of the transmission channel change over time, pilot channel estimator 218a and channel estimator 218b provide updated channel estimates to channel estimate combiner 230, which updates the combined channel estimation output accordingly.

In the preferred embodiment, the output of decoder 212 sent to encoder 224 is additionally sent to control processor 216. Control processor 216 produces frame rate information for each received frame of data. Control processor 216 also performs validity checking of the received frames. Control processor 216 produces a fundamental channel quality metric based on the results of its rate determination and validity checking of received data. The fundamental channel quality metric is used to assign an appropriate weighting factor to the fundamental channel estimate in relation to the weighting factor assigned to the pilot channel estimate. The fundamental channel quality metric varies based on the validity of received frames based on the correctness of the CRC. Since different rate frames may also use different numbers of CRC bits, or have varying degrees of frame error checking protection, control processor 216 may additionally vary the fundamental channel quality metric according to received frame rate.

Control processor 216 is also connected to encoder 224. Control processor 216 sends frame rate information to encoder 224 for use in re-encoding the data received from decoder 212.

In the exemplary embodiment, channel estimate combiner 230 is a weighted-average combiner, which produces the combined channel estimation signal by performing a weighted average of the pilot and fundamental channel estimates in accordance with the following equations:

$$R_{COMB} = XR_{PILOT} + (1-X) R_{FUND} \quad (3)$$

$$I_{COMB} = XI_{PILOT} + (1-X) I_{FUND} \quad (4)$$

where $R_{COMB}$ and $I_{COMB}$ are the real an imaginary components of the combined channel estimate, $R_{PILOT}$ and $I_{PILOT}$ are the real an imaginary components of the pilot channel estimate, $R_{FUND}$ and $I_{FUND}$ are the real an imaginary components of the fundamental channel estimate, and X is a scaling factor. The scaling factor X has a value from 0 to 1. A scaling factor value of 1 results in a combined channel estimate which is equal to the pilot channel estimate. A scaling factor value of 0 results in a combined channel estimate which is equal to the fundamental channel estimate. The value of X represents a first multiplier, which is multiplied by the pilot channel estimate to produce a scaled channel estimate for the pilot channel. The value of (1−X) represents a second multiplier, which is multiplied by the fundamental channel estimate to produce a scaled channel estimate for the fundamental channel. The two scaled channel estimates are added together to produce the combined channel estimate.

Channel estimate combiner 230 additionally uses the fundamental channel quality metric provided by control processor 216 as a dynamic weighting factor to the channel estimates produced from the fundamental channel. When the fundamental channel quality metric indicates a high rate of frame errors, channel estimate combiner 230 increases the value of the scaling factor X. When frame errors occur, therefore, the combined channel estimate used for demodulating the supplemental channel is derived more from the pilot channel estimate and less from the fundamental channel estimate. In an alternative embodiment, a frame error causes the value of scaling factor X to be equal to 1 until a valid frame is received.

In an alternative embodiment of the invention, control processor 216 includes a smoothing module, which performs smoothing, or low-pass filtering, of the fundamental channel quality metric before it is sent to channel estimate combiner 230. This smoothing helps to make the weighted average performed by channel estimate combiner 230 less susceptible to high-frequency noise inherent in the channel.

In yet another embodiment of the current invention, the receiver knows the relative gains used by relative gain modules 116 and 118 when transmitting the pilot and fundamental channel signals. In this embodiment, the value of X is adjusted such that the ratio of the first multiplier over the second multiplier is equal to the ratio of the transmit gain of the pilot channel over the transmit gain of the fundamental channel.

In the preferred embodiment, the fundamental channel quality metric provided by control processor 216 to channel estimate combiner 230 is synchronized with the reference signal provided to channel estimator 218b. This can be accomplished by incorporating a delay or buffer into control processor 216. Control processor 216 may also perform a smoothing function to the fundamental channel quality metric before providing it to channel estimator 218b. In the preferred embodiment, however, the fundamental channel quality metric produced by control processor 216 is not smoothed, and may change suddenly on frame boundaries.

The I and Q component samples used as input to Walsh despreader 236 are sent through delay elements 232, which serve to synchronize the output of Walsh despreader 236 with the output of channel estimate combiner 230. Delay elements 232 could instead be placed between Walsh despreader 236 and dot product module 238 without departing from the present invention. Walsh despreader 236 uses the Walsh function $W_S$ used by the transmitter's Walsh spreader 114, and produces decovered supplemental channel I and Q components. These decovered supplemental channel components, along with the combined channel estimation signal from channel estimate combiner 230, are used as input for dot product module 238. product module 238 without departing from the present invention. Walsh despreader 236 uses the Walsh function $W_S$, used by the transmitter's Walsh spreader 114, and produces decovered supplemental channel I and Q components. These decovered supplemental channel components, along with the combined channel estimation signal from channel estimate combiner 230, are used as input for dot product module 238.

Dot product module 238 computes the magnitude of the projection of the supplemental channel signal onto the combined channel estimate vector, resulting in a scalar projection output. The output of dot product module 238 is then deinterleaved in deinterleaver 240, which performs the inverse function of interleaver 108. The output of deinterleaver 240 is provided to decoder 242, which performs the inverse function of interleaver 104.

Throughout the wireless receiver portrayed in FIG. 3, one skilled in the art will appreciate that any of the delay elements 220, 222, or 232 could be implemented as accumulators or buffers without departing from the current invention. In addition, one skilled in the art will appreciate that pairs of delay elements, for example delay elements 232a and 232b, may be implemented separately, or combined into a single delay module which performs the same function, without departing from the current invention.

Though the preferred embodiment shown uses orthogonal Walsh functions to accomplish sub-channel decoding, one skilled in the art will appreciate that the sub-channel decoding could also be accomplished using TDMA or PN coding without departing from the current invention. In an embodiment utilizing PN coding, reference signals $W_S$, $W_P$, and $W_F$ are replaced by PN codes corresponding to the supplemental, pilot, and fundamental channels respectively.

What is claimed is:

1. An apparatus for receiving an information signal, comprising:
   means for performing pilot channel estimation based on a pilot sub-channel signal to produce a pilot channel estimate;
   first means for extracting a first sub-channel signal from said information signal;
   first means for performing channel estimation, operably connected to said first means for extracting, for producing a first channel estimate;
   a channel estimate combiner, operably connected to said means for performing pilot channel estimation and said first means for performing channel estimation, for combining said pilot channel estimate and said first channel estimate to produce a combined channel estimate;
   second means for extracting a second sub-channel signal from said information signal; and
   a first dot product module, operably connected to said channel estimate combiner and said second means for extracting, for producing a sub-channel symbol stream based on said second sub-channel signal and said second channel estimate.

2. The apparatus of claim 1 wherein said first means for extracting comprises a first pseudonoise (PN) despreader and said second means for extracting comprises a second PN despreader.

3. The apparatus of claim 1 wherein said means for performing pilot channel estimation is a pilot channel estimator for producing said pilot channel estimate based on a pilot pseudonoise (PN) code reference signal.

4. The apparatus of claim 1 wherein said means for performing pilot channel estimation is a pilot channel estimator for producing said pilot channel estimate based on a pilot Walsh code reference signal.

5. The apparatus of claim 4 wherein said pilot Walsh code is complex, and wherein said pilot channel estimator comprises complex mixers.

6. The apparatus of claim 1 wherein said first means for extracting is a first Walsh despreader, and wherein said second means for extracting is a second Walsh despreader.

7. The apparatus of claim 6 further comprising a pseudonoise (PN) despreader for providing said information signal to said means for performing pilot channel estimation, to said first means for extracting, and to said second means for extracting.

8. The apparatus of claim 7 wherein said PN despreader is a complex PN despreader.

9. The apparatus of claim 1 wherein said channel estimate combiner is a weighted-average combiner for multiplying said pilot channel estimate by a pilot multiplier to produce a scaled pilot channel estimate, and multiplying said first channel estimate by a first multiplier to produce a scaled first channel estimate, and adding said scaled pilot channel estimate to said scaled first channel estimate to produce said combined channel estimate.

10. The apparatus of claim 9 wherein the ratio of said pilot multiplier over said first multiplier is approximately equal to the ratio of transmit gain of said pilot sub-channel signal over transmit gain of said first sub-channel signal.

11. The apparatus of claim 9 wherein said means for performing pilot channel estimation is a pilot filter.

12. The apparatus of claim 9 wherein said information signal comprises a composite I signal and a composite Q signal, and wherein said means for performing pilot channel estimation comprises a first mixer for mixing said composite I signal with a Walsh function, and a second mixer for mixing said composite Q signal with said Walsh function.

13. The apparatus of claim 12 wherein said means for performing pilot channel estimation further comprises a first noise rejection filter for filtering the output signal of said first mixer, and a second noise rejection filter for filtering the output of said second mixer.

14. The apparatus of claim 1 wherein said means for performing pilot channel estimation comprises a delay module for synchronizing said pilot channel estimate with said first channel estimate.

15. The apparatus of claim 1 wherein said first means for performing channel estimation comprises a second dot product module for receiving said pilot channel estimate and said first sub-channel signal and producing a scalar first channel signal.

16. The apparatus of claim 15 wherein said first means for performing channel estimation further comprises a channel estimator for receiving the output of said second dot product module and said first sub-channel signal and producing said first channel estimate.

17. The apparatus of claim 15 further comprising:
   a deinterleaver, operably connected to said second dot product module;
   a forward error correction decoder, operably connected to said deinterleaver;
   a forward error correction encoder, operably connected to said forward error correction decoder;
   an interleaver, operably connected to said forward error correction encoder; and
   a channel estimator, operably connected to said interleaver and said first means for extracting.

18. The apparatus of claim 17 wherein said deinterleaver is a block deinterleaver and said interleaver is a block interleaver.

19. The apparatus of claim 17 wherein said deinterleaver is a bit reversal deinterleaver and said interleaver is a bit reversal interleaver.

20. The apparatus of claim 17 wherein said deinterleaver is a convolutional deinterleaver and said interleaver is a convolutional interleaver.

21. The apparatus of claim 17 wherein said deinterleaver is a turbo deinterleaver and said interleaver is a turbo interleaver.

22. The apparatus of claim 17 wherein said forward error correction decoder is a turbo code decoder and said forward error correction encoder is a turbo code encoder.

23. The apparatus of claim 17 wherein said forward error correction decoder is a block decoder and said forward error correction encoder is a block encoder.

24. The apparatus of claim 17 wherein said forward error correction decoder is a trellis decoder and said forward error correction encoder is a convolutional encoder.

25. The apparatus of claim 17 further comprising a control processor, operably connected to said forward error correction decoder and said forward error correction encoder, for receiving error corrected symbols from said error correction decoder, performing frame quality checking and rate determination for said error corrected symbols, producing frame rate information and a frame quality metric signal, and providing said frame rate information to said error correction encoder.

26. The apparatus of claim 25 wherein said control processor comprises a smoothing module for performing smoothing of said frame quality metric signal.

27. The apparatus of claim 25 wherein said channel estimate combiner is a weighted-average combiner for multiplying said pilot channel estimate by a pilot multiplier to produce a scaled pilot channel estimate, and multiplying said first channel estimate by a first multiplier to produce a scaled first channel estimate, and adding said scaled pilot channel estimate to said scaled first channel estimate to produce said combined channel estimate.

28. The apparatus of claim 27 wherein said control processor provides said frame rate information to said channel estimate combiner, and wherein said channel estimate combiner adjusts the ratio of said pilot multiplier to said first multiplier based on said frame rate information.

29. The apparatus of claim 27 wherein said control processor provides said frame quality metric signal to said channel estimate combiner, and wherein said channel estimate combiner adjusts the ratio of said pilot multiplier to said first multiplier based on said frame quality metric signal.

30. The apparatus of claim 27 wherein said control processor provides said frame quality metric and said frame rate information to said channel estimate combiner, and wherein said channel estimate combiner adjusts the ratio of said pilot multiplier to said first multiplier based on said frame quality metric and said frame rate information.

31. A process for decoding a signal, comprising the steps of:
   a) generating a pilot channel estimate from an information signal based on a pilot sub-channel signal;
   b) extracting a first sub-channel signal from said information signal;
   c) generating a first channel estimate based on said first sub-channel signal;
   d) combining said pilot channel estimate and said first channel estimate to produce a combined channel estimate;
   e) extracting a second sub-channel signal from said information signal; and
   f) performing a first dot product operation of said combined channel estimate and said second sub-channel signal to produce a sub-channel symbol stream.

32. The process of claim 31 wherein said step of extracting a first sub-channel signal comprises pseudonoise (PN) despreading using a first PN channel code, and said step of extracting a second sub-channel signal comprises PN despreading using a second PN channel code.

33. The process of claim 32 wherein said step of generating a pilot channel estimate comprises a PN despreading step based on a pilot PN channel code.

34. The process of claim 31 wherein said step of generating a pilot channel estimate comprises filtering of said information signal without mixing said information signal with a pilot Walsh code.

35. The process of claim 31 wherein said step of generating a pilot channel estimate comprises Walsh despreading based on a pilot Walsh code.

36. The process of claim 31 wherein said step of extracting a first sub-channel signal comprises a first Walsh despreading step based on a first Walsh code, and said step of extracting a second sub-channel signal comprises a second Walsh despreading step based on a second Walsh code.

37. The process of claim 36 wherein said first and second Walsh codes are complex, and wherein said first and second Walsh despreading steps are complex Walsh despreading.

38. The process of claim 36 further comprising the step of performing pseudonoise (PN) despreading of a downconverted signal to generate said information signal.

39. The process of claim 38 wherein said PN despreading is complex PN despreading.

40. The process of claim 39 wherein said step of generating a pilot channel estimate comprises synchronizing said pilot channel estimate with said first channel estimate.

41. The process of claim 31 wherein said step of combining comprises the sub-steps of:
d.1) multiplying said pilot channel estimate by a pilot multiplier to produce a scaled pilot channel estimate;
d.2) multiplying said first channel estimate by a first multiplier to produce a scaled first channel estimate; and
d.3) adding said scaled pilot channel estimate to said scaled first channel estimate to produce said combined channel estimate.

42. The process of claim 41 wherein the ratio of said pilot multiplier over said first multiplier is approximately equal to the ratio of a gain used to transmit said pilot sub-channel signal over a gain used to transmit said first sub-channel signal.

43. The process of claim 41 wherein said step of generating a pilot channel estimate comprises filtering said information signal to produce said pilot channel estimate.

44. The process of claim 41 wherein said step of generating a pilot channel estimate comprises the sub-steps of:
a.1) mixing the I component of said information signal with a pilot Walsh code to produce a first Walsh despread I signal;
a.2) mixing the Q component of said information signal with said pilot Walsh code to produce a first Walsh despread Q signal;
a.3) filtering said first Walsh despread I signal to produce the I component of said pilot channel estimate; and
a.4) filtering said first Walsh despread Q signal to produce the Q component of said pilot channel estimate.

45. The process of claim 41 wherein said step of generating a pilot channel estimate comprises the sub-steps of:
a.1) multiplying said information signal with a complex pilot Walsh code to produce a first complex Walsh despread signal; and
a.2) filtering the I component of said first complex Walsh despread signal to produce the I component of said pilot channel estimate; and
a.3) filtering the Q component of said first complex Walsh despread signal to produce the Q component of said pilot channel estimate.

46. The process of claim 31 wherein said step of generating a first channel estimate comprises the sub-steps of:
c.1) performing a second dot product operation of said pilot channel estimate and said first sub-channel signal to produce a scalar first channel signal;
c.2) delaying said first sub-channel signal to produce a delayed first sub-channel signal; and
c.3) performing channel estimation from said delayed first sub-channel signal, using said scalar first channel signal as a reference, to produce said first channel estimate.

47. The process of claim 31 wherein said step of generating a first channel estimate comprises the sub-steps of:
c.1) performing a second dot product operation of said pilot channel estimate and said first sub-channel signal to produce a scalar first channel signal;
c.2) deinterleaving said scalar first channel signal, in accordance with a deinterleaving format, to produce a deinterleaved first channel signal;
c.3) performing forward error correction decoding of said deinterleaved first channel signal, in accordance with a forward error correction format, to produce an error correction decoded first channel signal;
c.4) performing forward error correction encoding of said error correction decoded first channel signal, in accordance with said forward error correction format, to produce an error correction encoded first channel signal;
c.5) interleaving said error correction encoded first channel signal, in accordance with an interleaving format, to produce an estimated first sub-channel signal;
c.6) delaying said first sub-channel signal to produce a delayed first sub-channel signal which is synchronized with said estimated first sub-channel signal; and
c.7) performing channel estimation based on said delayed first sub-channel signal and said estimated first sub-channel signal to produce said first channel estimate.

48. The process of claim 47 wherein said deinterleaving format is a block deinterleaving format and said interleaving format is a block interleaving format.

49. The process of claim 47 wherein said deinterleaving format is a bit reversal deinterleaving format and said interleaving format is a bit reversal interleaving format.

50. The process of claim 47 wherein said deinterleaving format is a convolutional deinterleaving format and said interleaving format is a convolutional interleaving format.

51. The process of claim 47 wherein said deinterleaving format is a turbo deinterleaving format and said interleaving format is a turbo interleaving format.

52. The process of claim 47 wherein said forward error correction format is a turbo code format.

53. The process of claim 47 wherein said forward error correction format is a block error correction coding format.

54. The process of claim 47 wherein said forward error correction format is a convolutional error correction coding format.

55. The process of claim 47 further comprising the step of performing frame quality checking and rate determination on said error correction decoded first channel signal, to produce frame rate information and a frame quality metric signal, and wherein the frame rate used in performing said forward error correction encoding is based on said frame rate information.

56. The process of claim 55 wherein said frame quality checking comprises a smoothing step for performing smoothing of said frame quality metric signal.

57. The process of claim 55 wherein said combining step comprises the sub-steps of:

d.1) generating a pilot multiplier and a first multiplier;

d.2) multiplying said pilot channel estimate by said pilot multiplier to produce a scaled pilot channel estimate;

d.3) multiplying said first channel estimate by said first multiplier to produce a scaled first channel estimate; and d.4) adding said scaled pilot channel estimate to said scaled first channel estimate to produce said combined channel estimate.

58. The process of claim 57 wherein the ratio of said pilot multiplier to said first multiplier are adjusted based on said frame rate information.

59. The process of claim 57 wherein the ratio of said pilot multiplier to said first multiplier are adjusted based on said frame quality metric signal.

* * * * *